United States Patent
Wötzel

(10) Patent No.: US 10,677,911 B2
(45) Date of Patent: Jun. 9, 2020

(54) MULTI-FUNCTION ANTENNA SYSTEM WITH RADAR REFLECTOR

(71) Applicant: SPUTNIK24 COMMUNICATION SYSTEMS GMBH, Leipzig (DE)

(72) Inventor: Frank E. Wötzel, Leipzig (DE)

(73) Assignee: SPUTNIK24 COMMUNICATION SYSTEMS GMBH, Leipzig (DE)

( * ) Notice: Subject to any disclaimer, the term of this patent is extended or adjusted under 35 U.S.C. 154(b) by 208 days.

(21) Appl. No.: 15/557,099

(22) PCT Filed: Mar. 4, 2016

(86) PCT No.: PCT/DE2016/000105
§ 371 (c)(1),
(2) Date: Sep. 11, 2017

(87) PCT Pub. No.: WO2016/141912
PCT Pub. Date: Sep. 15, 2016

(65) Prior Publication Data
US 2018/0045822 A1 Feb. 15, 2018

(30) Foreign Application Priority Data

Mar. 9, 2015 (DE) .................... 20 2015 001 972 U

(51) Int. Cl.
*G01S 13/75* (2006.01)
*H01Q 9/28* (2006.01)
(Continued)

(52) U.S. Cl.
CPC .............. *G01S 13/75* (2013.01); *H01Q 9/28* (2013.01); *H01Q 21/205* (2013.01);
(Continued)

(58) Field of Classification Search
CPC .......... G01S 13/75; G01S 13/767; G01S 7/36; G01S 7/38; H01Q 9/28; H01Q 21/205;
(Continued)

(56) References Cited

U.S. PATENT DOCUMENTS 4,117,485 A * 9/1978 Gorr ......................... G01S 7/38
342/13
4,396,920 A 8/1983 Grimberg et al.
(Continued)

FOREIGN PATENT DOCUMENTS

DE 30 46 255 A1 10/1981
DE 32 18 690 C1 7/1986
(Continued)

OTHER PUBLICATIONS

DE Search Report dated Sep. 3, 2015 as received in Application No. 202015001972.2.
(Continued)

*Primary Examiner* — Vladimir Magloire
*Assistant Examiner* — Michael W Justice
(74) *Attorney, Agent, or Firm* — Maschoff Brennan

(57) ABSTRACT

The invention relates to a multi-functional compact antenna system having high broadband capability, comprising a radar reflector that comprises at least two bipolar radiating elements, the radiating elements being symmetrically arranged in a cross-wise manner at an angle of 90°+/−10° and being electrically connected to one another at least at their intersection. The invention provides for an omnidirectional antenna characteristic in the azimuth plane and allows to maximise the radiation in the elevation plane around the elevation angle close to zero degrees.

7 Claims, 9 Drawing Sheets

(51) Int. Cl.
*H01Q 21/20* (2006.01)
*H01Q 21/29* (2006.01)
*H01Q 3/44* (2006.01)
*H01Q 1/34* (2006.01)
*H01Q 5/25* (2015.01)

(52) U.S. Cl.
CPC .............. *H01Q 21/29* (2013.01); *H01Q 1/34* (2013.01); *H01Q 3/44* (2013.01); *H01Q 5/25* (2015.01)

(58) Field of Classification Search
CPC ............ H01Q 21/29; H01Q 5/25; H01Q 1/34; H01Q 3/44; H01Q 13/10; H01Q 13/16; H01Q 13/106; H01Q 11/00; H01Q 11/02; H01Q 11/12; H01Q 15/14; H01Q 15/18; H01Q 15/0006; H01Q 25/005; H01Q 21/064; H01Q 21/08; H01Q 21/26; H01Q 19/108; H01Q 9/26
USPC ............. 343/787, 795, 797, 866, 793; 342/5
See application file for complete search history.

(56) References Cited

U.S. PATENT DOCUMENTS

| | | |
|---|---|---|
| 5,872,546 A | 2/1999 | Ihara et al. |
| 6,667,721 B1 | 12/2003 | Simonds |
| 7,280,082 B2 * | 10/2007 | Theobold .................. H01Q 1/12 343/770 |
| 7,518,565 B1 | 4/2009 | Horner et al. |
| 2005/0162332 A1 * | 7/2005 | Schantz .................. H01Q 13/10 343/795 |
| 2010/0245184 A1 * | 9/2010 | Talty ........................ H01Q 1/44 343/702 |

FOREIGN PATENT DOCUMENTS

| | | |
|---|---|---|
| DE | 202 20 086 U1 | 3/2003 |
| DE | 102 35 222 A1 | 2/2004 |
| DE | 20 2013 102 314 U1 | 7/2013 |
| EP | 1 542 314 A1 | 6/2005 |
| EP | 1 780 830 A1 | 5/2007 |
| EP | 2 683 030 A1 | 1/2014 |
| GB | 2 165 097 A | 4/1986 |
| WO | 2004/038452 A1 | 5/2004 |

OTHER PUBLICATIONS

"Broadband Antennas," Chapter 12, 13th Edition, pp. 357-385 (2013) (English Abstract).
"Multiband Vertical Antennas," The ARRL Antenna Book, Chapter 10, pp. 1-18 (English Translation).

* cited by examiner

MULTI-FUNCTION ANTENNA SYSTEM WITH RADAR REFLECTOR

BACKGROUND

The invention relates to a multi-function antenna system with a radar reflector having an extremely high broadband capability, which, with small dimensions, achieves high efficiency for communication applications and is suitable, in particular, for mobile applications.

Mobile communication takes up a considerable portion in the design of private, commercial and machine-to-machine applications. The bandwidth requirement has increased dramatically in recent years.

In order to cover the different areas of need, new technologies have been developed, frequency bands have been extended or released for mobile communication. At the same time, the demand and requirements for the secure transmission of events, sensor values or position and navigation data, which should be able to be used in real time as far as possible, are increasing.

The increase in the data rates requires a likewise considerable increase in the frequency ranges used for communication.

As a result of the distribution of the frequencies which was previously carried out with international coordination, the available resources are scarce and the frequency ranges which can be used are not directly side by side. The result of this is that a modern antenna system must cover a drastically wider bandwidth and should be able to be used for various communication principles.

The so-called 4G or LTE technology is becoming increasingly widespread.

The technical design of LTE requires the user terminal to have antennas which are suitable for the Multiple-Input, Multiple-Output MIMO technology in order to ensure a high data throughput.

At the same time, the maximum effective transmission power of the terminal is restricted by legislation, with the result that the regulatory requirements must not be exceeded here.

The so-called cell size of a mobile radio cell is designed for optimum customer coverage by the operators. The result of this is that the cell size is considerably smaller in conurbations than in areas with a low population density. However, small cell sizes also technically mean that the requirements imposed on the so-called link budget are considerably lower, inter alia as a result of the relatively short distance between the terminal and the mobile radio transmission mast. As a result, antennas which are not very efficient can also be used on the terminal without having to accept drastic losses in the data throughput.

This circumstance is different in rural regions or even in bodies of water near to the coast.

Extremely high requirements emerge when using mobile communication on watercraft and aircraft.

The number and type of communication applications are disproportionately greater than in land vehicles, for example, and are subject to considerably more stringent requirements on the antenna system to be used. Added to this is the usually large distance to the closest mobile radio transmission mast when using LTE, for example.

The antenna system must therefore be adapted to the conditions of use in a highly efficient way and in the best-possible manner. Losses, for example as a result of poor efficiency of the antenna system, should be imperatively avoided. Complicating factors for maritime applications are the very small available space for antennas, the already existing multiplicity of other antennas, the harsh environmental conditions, considerable mechanical stresses and the existence of a multiplicity of high-energy interference sources, for example radar systems in the immediate environment.

In shipping, a number of systems and methods are prescribed for the purpose of avoiding accidents, collisions and dangerous situations, for example the presence and use of radar systems.

Owing to the design, not all watercraft have the same radar cross section and, under certain circumstances, can scarcely be detected by the traffic radar of another ship. This is the case, for example, in small yachts, fishing boats and sailing boats. The use of additional radar reflectors is prescribed and is at least strongly recommended in some regions in order to increase the visibility, that is to say the radar cross section, of the watercraft.

Many antennas are designed solely for the use of one polarization and/or one frequency range. The combination of various frequency ranges and polarizations, while ensuring a high degree of separation/isolation inside an antenna arrangement, appears to be problematic according to the prior art.

The requirements for protecting nearby assemblies from overloading by other high-power services, for example radar applications, have previously been taken into account only inadequately or not at all in antennas.

Omnidirectional broadband antennas have been known for a long time both from mobile communication and from communication from fixed locations. Rothammel, Karl: "Antennenbuch (10. Auflage) [Antenna book (10th edition)" and Hall, Gerald L./ARLL: "The ARRL Antenna Book (13th edition)" describe so-called discone antennas which have an omnidirectional directional characteristic in the azimuth and have a broadband capability of up to 1:5. The structure, size and restriction to one polarization plane and the values in adjusting the antenna, the VSWR (Voltage Sounding Wave Ratio) and the direct exposure of the structure to the environment are disadvantageous, in particular.

DE 30 46 255 A1 describes a broadband antenna for the radio frequency band which has a transmission line coupled to a monopole antenna. The structure, size and restriction to one polarization plane are also disadvantageous here. The described VSWR of 1:2.5 is particularly critical. This value results in strong reflections and a deterioration in the power transmission and the adjustment of following assemblies. Furthermore, this is a conventional monopole antenna structure having a so-called ground plane. As a result, the emission of the energy is concentrated on higher elevation angles with increasing frequency.

The antenna described in DE 202 20 086 U1 is very well-suited as a directional antenna and accordingly does not have an omnidirectional characteristic of the antenna pattern in the azimuth. The restricted frequency range and the complicated control are disadvantageous, in particular. MIMO applications are possible to a limited extent.

EP 1 542 314 A1 describes a three-dimensional monopole design for so-called UWB (Ultra Wide Band) applications. The aim of UWB communication is, in particular, to allow very high data rates between devices which are spatially very close together, for example on a desk, when networking the devices. Like in DE 30 46 255 A1, the described arrangements constitute a monopole antenna above a ground plane, with the result that, although the arrangement is well-suited to installation on devices, for example laptops, the omnidirectional emission with a preferred direction at an elevation of 0° cannot be concentrated in broadband on account of the design and does not correspond to the subject matter of the described arrangement. The fact that none of the described embodiments allows a broadband capability of above 1:3.5 is likewise disadvantageous. Another disadvantage is that MIMO applications which are based on various polarizations, like in the case of LTE, do not appear to be possible.

The monopole antenna described in EP 2 683 030 A1 has a high broadband capability of 1. As becomes clear from FIG. 2A and FIG. 2B, the emission of the antenna cannot be omnidirectionally concentrated in the azimuthal plane in a disadvantageous manner. An additional disadvantage results from the preferred arrangement of the antenna inside the electronic circuit, as a result of which the efficiency and gain of the antenna are very highly limited.

DE 20 2013 102 314 U1 describes an antenna arrangement for MIMO applications which appears to be well-suited to LTE applications. The gain and polarization separation are suitable for use on terminals at a relatively large distance from the next LTE base station. The lack of omnidirectional emission and the restricted bandwidth of at most 1:3.3, based on the first frequency which can be used, are disadvantageous.

The mechanical design and the lack of opportunities to integrate other communication services and the susceptibility to mechanical vibrations are also disadvantageous.

The broadband antenna described in DE 102 35 222 A1 is in the form of a monopole with a dipole and disadvantageously has an omnidirectional antenna characteristic in the azimuthal plane with concentration of the radiation on an elevation plane of 0° only in part of the frequency range which can be used. Another disadvantage is the low efficiency in the lower frequency range. According to the exemplary embodiment, the antenna is not suitable for GSM, 3G or LTE communication services. The bandwidth which can be used with good efficiency is in a ratio of 1:6. The embodiment is associated with the disadvantage of a very small radar cross section. The type of mechanical design, which allows free oscillation of the antenna under the effect of vibrations, is likewise disadvantageous.

The above-mentioned arrangements are not suitable as a radar reflector or are suitable only to an extremely limited extent.

The previously known antenna designs cited on the basis of the examples have unsatisfactory properties with regard to their usability for a multi-function antenna of a very wide bandwidth, small dimensions with high efficiency and as a radar reflector.

So-called radar reflectors are used for the purpose of increasing the radar visibility of watercraft. The additional space requirement and the design are problematic. Passive radar reflectors are commercially available in different embodiments and vary in size between approximately 25 cm and 50 cm in diameter (ball design) and in height from 30 cm to 70 cm (tube design). The radar reflectors make it possible to increase the radar cross section in a technically good manner. Their unsuitability for other communication services is considerably disadvantageous.

Therefore, the invention is based on the object of providing a multi-functional compact antenna system of high broadband capability with a radar reflector, which is able to exhibit an omnidirectional antenna characteristic in the azimuthal plane, to maximize the radiation in the elevation plane close to elevation angles around 0° and which has high mechanical stability.

SUMMARY

According to an aspect of the invention a multi-function antenna system with a radar reflector is provided, in which the antenna comprises at least two bipolar radiating elements, at least one of which is a primary-fed radiating element and/or at least one of which is a secondary-fed radiating element, the primary-fed and secondary-fed radiating elements are symmetrically arranged in a cross-wise manner at an angle of 90°+/−10° and are electrically connected to one another at least at their intersection, the primary-fed and secondary-fed radiating elements are in the form of bipolar conductive surfaces on and/or in a dielectric carrier and are permanently connected to the latter, the conductive surfaces decrease from the inside outward and the decrease in the surfaces is determined by linear sections and non-linear sections, the primary-fed radiating element has at least one line for coupling electromagnetic signals in and out, the primary-fed radiating element feeds the secondary radiating elements, and filters comprising planar structures and/or a combination of planar structures with concentrated components for reflecting signals from radar transmissions are arranged on the inside of the antenna in the feeding line on the dielectric carrier.

A special design of the invention provides that, in addition to the two radiating elements connected orthogonally to each other, further secondarily fed radiator elements are arranged with an angular offset of 45 degrees each in such a way that they are located around the same middle plane of symmetry and electrically connected to the primary-fed radiating element and at least one secondary-fed radiating element.

According to another embodiment, the antenna is covered toward the top and bottom with a metal body in each case, in a manner orthogonal to the plane of symmetry, and the primary-fed radiating element and the secondary-fed radiating element are conductively and mechanically connected to these bodies.

The metal bodies are preferably in the form of conductive boxes for receiving further assemblies, and/or an electrically insulated contact point for receiving further antennas is fitted to at least one dielectric carrier outside the region of a metallization.

According to another embodiment, the connection of at least two radiating elements is designed using slot/plug technology.

Additional antennas known according to the prior art are advantageously arranged on the conductive receiving boxes.

Another embodiment provides for filters for reflecting signals from radar transmissions to be fitted between the feed point and following assemblies.

According to another embodiment, a further radiating element is arranged at at least one primary-fed radiating element and/or secondary-fed radiating element and/or secondary-fed auxiliary element in the same plane or orthogonal thereto, the additionally arranged radiating element being suitable for producing broadband orthogonal polarization.

With its very compact design, the multi-function antenna system according to the invention simultaneously makes it possible to receive and transmit a wide variety of signals in an extremely wide frequency range of approximately 440 MHz to approximately 11 GHz with a uniformly low VSWR of less than 1:2.5. Highly efficient transmission of electromagnetic signals for a wide variety of purposes can be achieved, according to the invention, in an extremely wide frequency range using only one antenna. It has a high polarization purity and makes it possible to easily couple following assemblies.

The antenna system according to the invention is also associated with the advantage that a high degree of decoupling between the polarizations can be achieved by the additional use of further antennas of another polarization, and the particular suitability for MIMO applications, for example for LTE, is therefore provided, inter alia.

The antenna system according to the invention is associated with the further advantage that the main emission direction is omnidirectional to the greatest possible extent in the entire usable frequency range at the elevation around 0° and very particular advantages for transmitting signals to or from remote communication partners arise thereby since these partners are naturally in the range of very low elevation angles with increasing distance. This advantage is particularly prominent in the field of maritime applications and therefore in the elevation plane of 450 MHz to 3000 MHz and 9400 MHz.

Further advantages emerge from the fact that following assemblies are effectively protected against harmful radar signals and the energy of the radar signals, which is received via the antenna, is largely not converted into heat, but rather is emitted again in a temporally offset manner at a low elevation by means of filtering, thus considerably increasing the radar cross section.

At the same time, there is the advantage that radar signals are reflected particularly well by the geometry of the arrangement of the components. Radar signals are intended to be understood as meaning signals from radar systems in the maritime field of application.

Another important advantage of the antenna system according to the invention is that it is possible to fit further antennas on or to the receiving boxes, which antennas are suitable for satellite services (GPS, GLONASS, INMARSAT, THURAYA etc.), for example, as a result of the high level of decoupling in a frequency-overlapping manner.

Another important advantage of the arrangement according to the invention is its high mechanical stability with simultaneously simple production possibilities and the use of robust materials which are easy to procure.

At the same time, the arrangement according to the invention is associated with the advantage of the high reproducibility of all electrical and mechanical properties and the high stability with respect to environmental influences.

BRIEF DESCRIPTION OF THE DRAWINGS

The invention will be explained in more detail on the basis of exemplary embodiments with reference to the accompanying drawings in which.

DETAILED DESCRIPTION

Figure 1A:
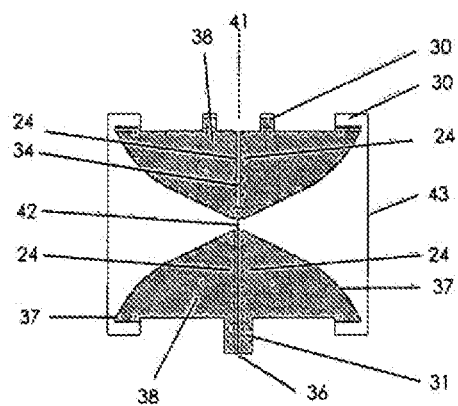
FIG. 1a shows the front side of the primary-fed radiating element.
Figure 1B:
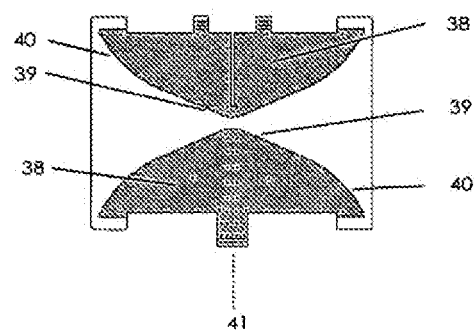
FIG. 1b shows the rear side of the primary-fed radiating element.

FIG. 1a shows the front side and FIG. 1b shows the rear side of the primary-fed bipolar radiating element 21 consisting of a dielectric carrier 43 on which conductive surfaces 38 are permanently fitted on the front and rear sides. FIG. 1a shows the feeding of the bipolar radiating element by means of a line 42, starting from a feed point 36 at the edge of the dielectric carrier 43. In this case, the feed point 36 is simultaneously in the form of an electrical and mechanical connecting element 31. The secondary-fed radiating elements 22 to be added later are fed in a vertical alignment with those edges of the conductive surfaces which are designated 24. The upper part of the primary-excited radiating element is provided with a slot 34 for receiving a secondary-fed radiating element 22 with an accurate fit. The conductive surfaces 38 have their greatest vertical extent in the center of the dielectric carrier 43 along the plane of symmetry 41 and then decrease toward the edges in a special ratio in zones having a linear boundary profile 39 and a non-linear boundary profile 40. In this case, the conductive surfaces 38 have an inner symmetry with respect to the axis 41 and likewise have a symmetry orthogonal thereto to the greatest possible extent, running through the center of the dielectric carrier 43. The front and rear sides of the dielectric carrier 43 are electrically connected to conductive material at points 37. The conductive surfaces 38 on the front and rear sides are identical in terms of their shape above one another. The dielectric carrier 43 also has fastening and connecting elements 30 which are used to fasten and connect it to the upper and lower receiving boxes 27, 28. The electrically conductive coating of these elements cannot be attributed to the effective active surface of the antenna since it is on the inside of a receiving box in the exemplary embodiment.

In the present exemplary embodiment, the outer fastening elements 32 are additionally formed in such a manner that they can receive further antennas 17, 171.

The dielectric properties of the carrier, the arrangement, size and geometry determine the electrical properties of the primary-fed element and influence the entire antenna system.

Figure 2A:
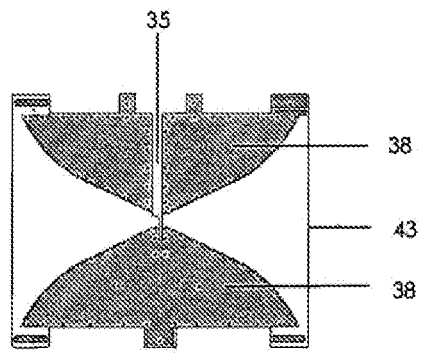
FIG. 2a shows the front side of the secondary-fed radiating element.
Figure 2B:
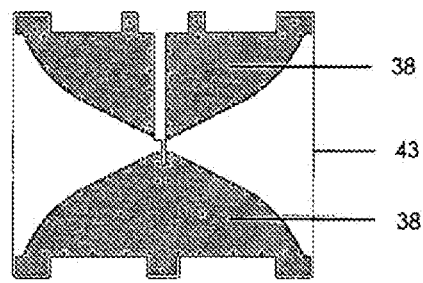
FIG. 2b shows the rear side of the secondary-fed radiating element.

FIG. 2a and FIG. 2b illustrate front and rear sides of the secondary-fed radiating element 22 which likewise consists of a dielectric carrier 43 with applied conductive surfaces 38 which are interconnected via electrical connections. The geometry of the conductive surfaces corresponds, to the greatest possible extent, to that of the primary-fed element 21, with the exception of the slot 35 which has been made wider in sections in order to enable simple mounting. The thickness and dielectric constant of the dielectric carrier 43 are identical to the carrier of the primary-fed element.

Figure 3A:
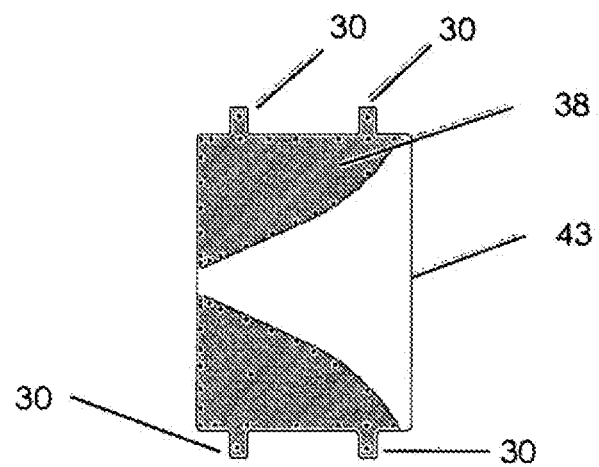
FIG. 3a shows the front side of the secondary-fed auxiliary element.
Figure 3B:
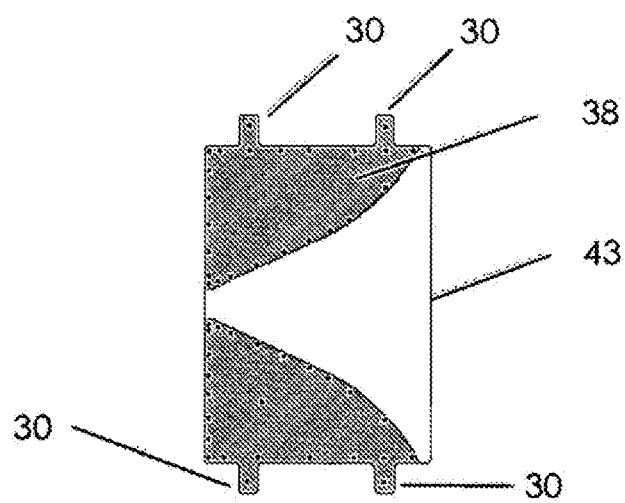
FIG. 3b shows the rear side of the secondary-fed auxiliary element.

FIG. 3a and FIG. 3b show the front and rear sides of a secondary-fed auxiliary element consisting of a dielectric carrier 43 of the same thickness and dielectric constant as the other radiating elements 21, 22 with a conductive coating 38 and fastening and electrical connecting elements outside the effective aperture surface of the antenna (since they project into the receiving boxes 27; 28). The secondary-fed auxiliary elements have the same extents in the vertical direction on their mounting surfaces but have been reduced by twice the thickness of the radiating elements 21, 22 in the horizontal direction.

The geometry and structure of the conductive surfaces correspond, to the greatest possible extent, to half the radiating elements 21, 22 and have been reduced by the thickness of the radiating elements in the horizontal extent.

The front and rear sides are congruent and are conductively connected to one another.

The radiating elements according to FIG. 1a to FIG. 3b are implemented on a conventional printed circuit board material using plated-through holes for producing the conductive connections described.

Figure 4A:
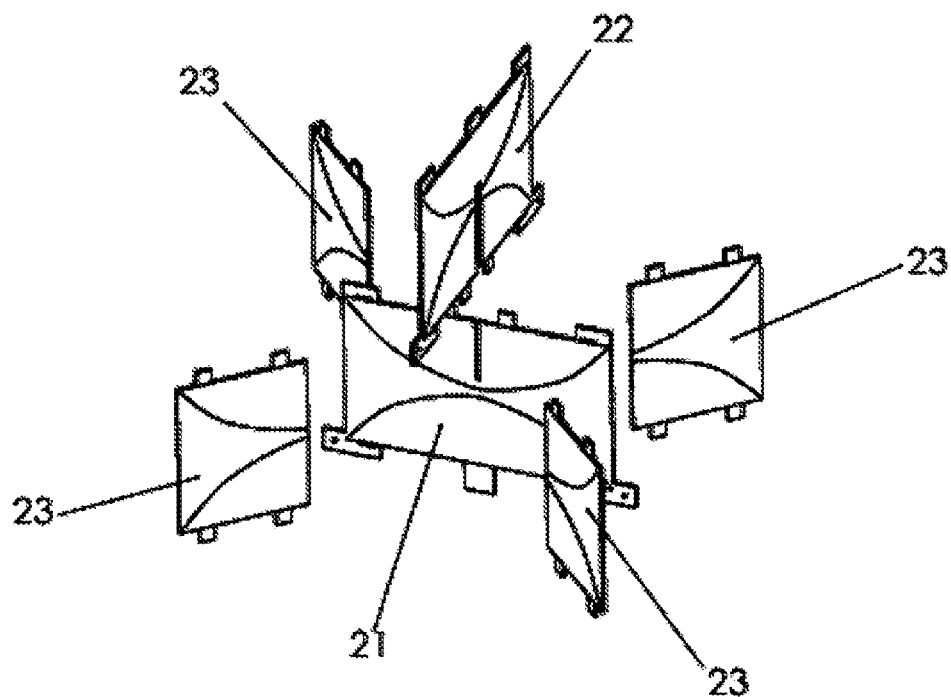
FIG. 4a shows an isometric sketch of a view of the separate arrangement of the radiating elements.
Figure 4B:
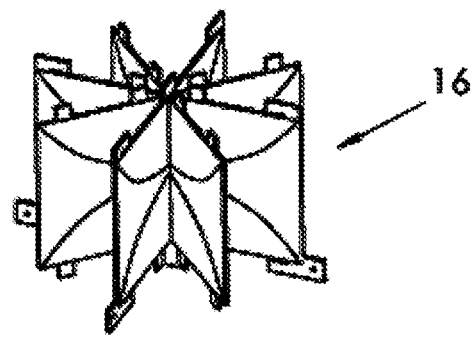
FIG. 4b shows an isometric sketch of a view of the connected arrangement of the radiating elements.
Figure 4C:
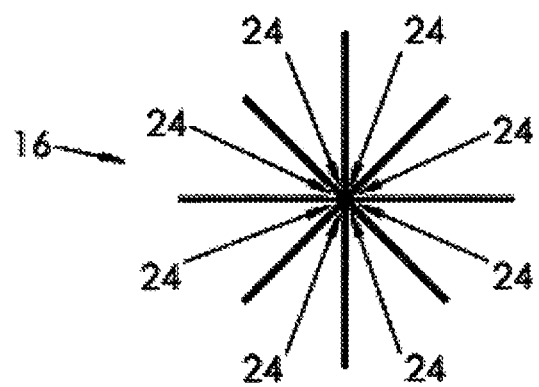
FIG. 4c shows a plan view of the connected arrangement of the radiating elements.

The basic arrangement of the primary-fed radiating element 21 with the secondary-fed radiating element 22 and four secondary-fed auxiliary elements 23 is clear from FIG. 4a. Assembly is effected by inserting the secondary-fed radiating element 22 into the primary-fed radiating element 21 and fixing them with respect to one another by means of a form fit by virtue of the shape of the slots 34, 35. The four secondary-fed auxiliary elements are each arranged at an angle of 45° thereto. FIG. 4b shows the basic structure of the resulting inner radiating arrangement 16. FIG. 4c shows the plan view of this radiating arrangement. The conductive surfaces are electrically connected to one another at the points 24 by means of soldering methods.

Figure 5:
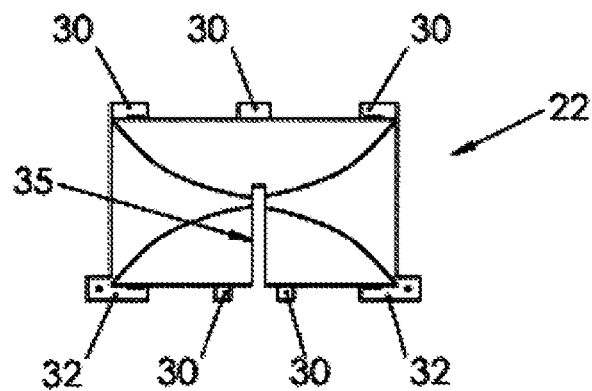
FIG. 5 shows a constructional rear view of the secondary-fed element.
Figure 6:
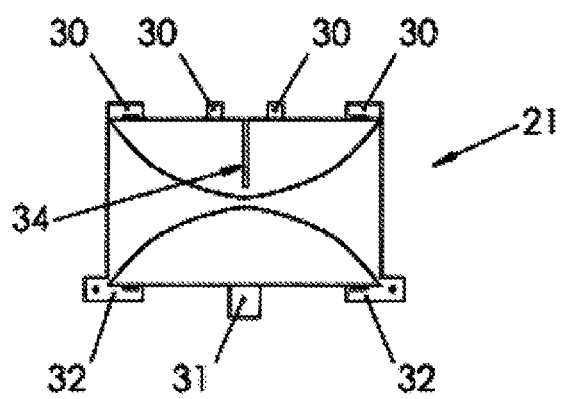
FIG. 6 shows a constructional rear view of the primary-fed element.

FIG. 5 and FIG. 6 schematically illustrate the secondary-fed radiating element 22 and the primary-fed radiating element 23 in such a manner that the fastening and connecting element 32 is present a total of four times in a special embodiment. Further antennas 17, 171 can be fastened and fed at these points 32, as is clearly illustrated in FIG. 7, FIG. 8 and FIG. 9.

Figure 9:
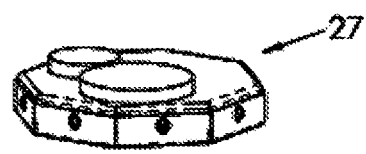
FIG. 9 shows an upper receiving box.
Figure 10:
FIG. 10 shows a lower receiving box.

In the present exemplary embodiment, the inner radiating arrangement is connected, in a mechanically terminating manner, to the radiating elements in an electrically conductive manner between two conductive receiving boxes 27, 28 according to FIG. 9 and FIG. 10 and results in a broadband multi-function antenna with a radar reflector.

Figure 8:
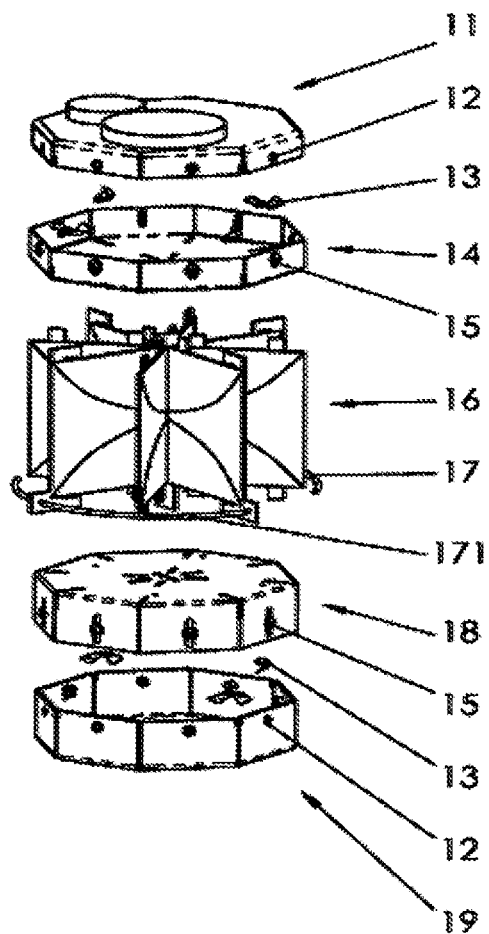
FIG. 8 shows an isometric assembly view of the antenna.

According to FIG. 8, the connection is effected both using mechanical connecting elements 13 and with the aid of a further form fit such that slots which penetrate the wall and match the connecting elements 30, 31 of the primary-fed and secondary-fed radiating elements 21 and 22 and of the secondary-fed auxiliary elements 23 with an accurate fit are inserted both in the base of the upper conductive connection box 27 and in the cover of the lower conductive connection box 28. The arrangement is assembled in this manner and makes electrical contact with all connecting points and is additionally fixed in a stable manner inside the receiving boxes by means of holding and connecting elements. In the exemplary embodiment, a soldered connection for producing the electrical connection and for increasing the mechanical stability is selected. The continuous slots 29 are designed with an excess in their longitudinal direction in order to be able to easily compensate for production tolerances.

Figure 7:
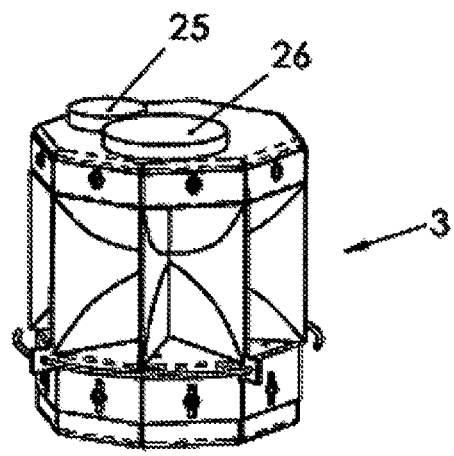
FIG. 7 shows an isometric view of the antenna.

In the isometric view according to FIG. 7, two further antennas 25, 26 according to the prior art are fitted.

FIG. 8 shows an overview of the components which are needed to produce the multi-function antenna system according to the invention with a radar reflector depicted in FIG. 7, an upper housing part 11 of the upper conductive receiving box 27, on which additional antennas 25, 26 according to the prior art are fitted and which has fastening elements 12 to which the associated lower part 14 is mechanically and electrically fastened, and the holding and connecting elements 13 for fixing the inner radiating arrangement 16, the further radiating elements 17, 171 according to the prior art and the upper part 18 of the lower receiving box 28 which is to be fastened thereto and has holding and fastening elements 13 and fastening elements 15. The lower housing part 14 of the lower receiving box 28 is mechanically and electrically connected at the fastening elements 15.

Figure 11:
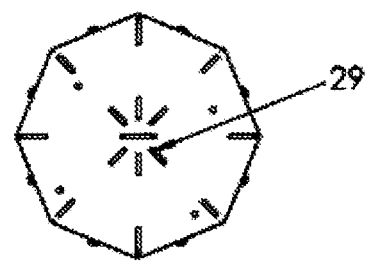
FIG. 11 shows a view of the upper receiving box from below.

FIG. 11 shows the view of the underside of the upper receiving box 27 with slots 29 which penetrate the wall.

Figure 12:
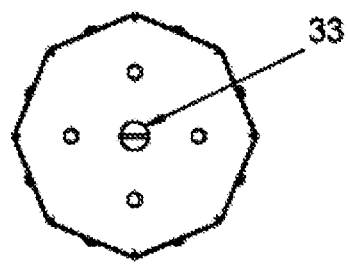
FIG. 12 shows a view of the lower receiving box from below.

FIG. 12 shows the view of the underside of the lower receiving box 28 with the electrical input and output of the exemplary embodiment.

Figure 13:
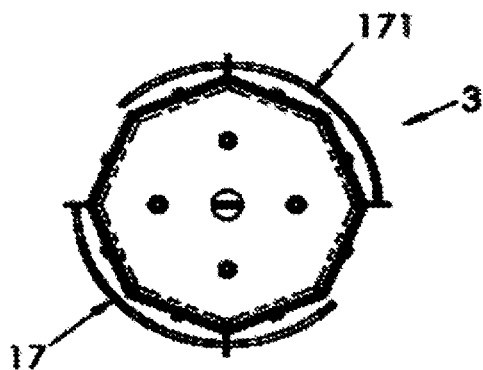
FIG. 13 shows a view of the antenna from below.
Figure 14:
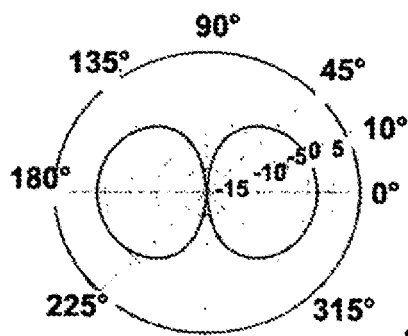
FIG. 14 shows an elevation pattern at 450 MHz.
Figure 15:
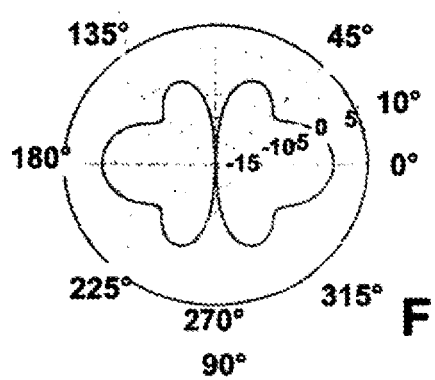
FIG. 15 shows an elevation pattern at 2800 MHz.
Figure 16:
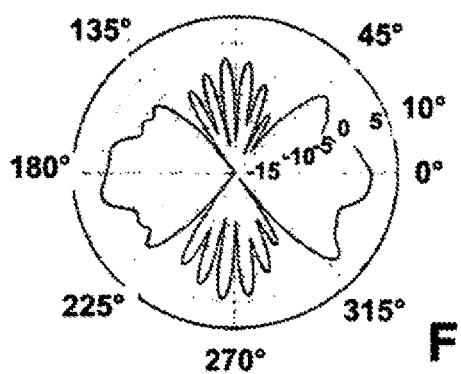
FIG. 16 shows an elevation pattern at 9400 MHz.
Figure 17:
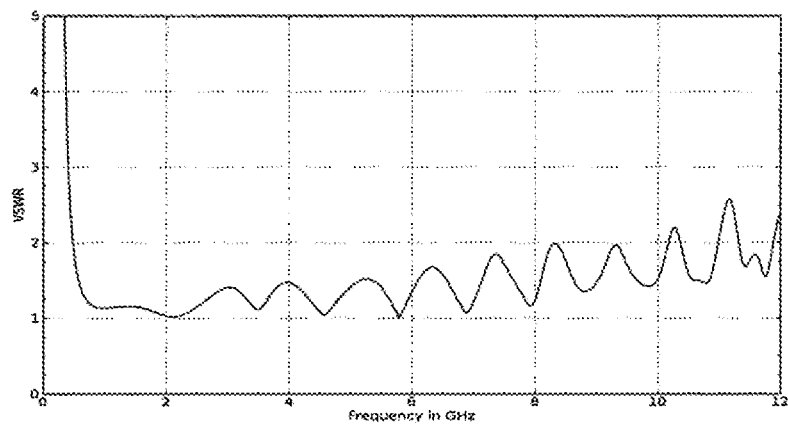
FIG. 17 shows a VSWR pattern.

FIG. 13 represents the view of the arrangement according to the invention from below according to the exemplary embodiment in order to illustrate the fitting of the further radiating elements 17, 171 according to the prior art.

The upper and lower receiving boxes are produced in a stamping/folding method or a laser folding method and consist of metal connections which can be soldered.

Figure 18A:
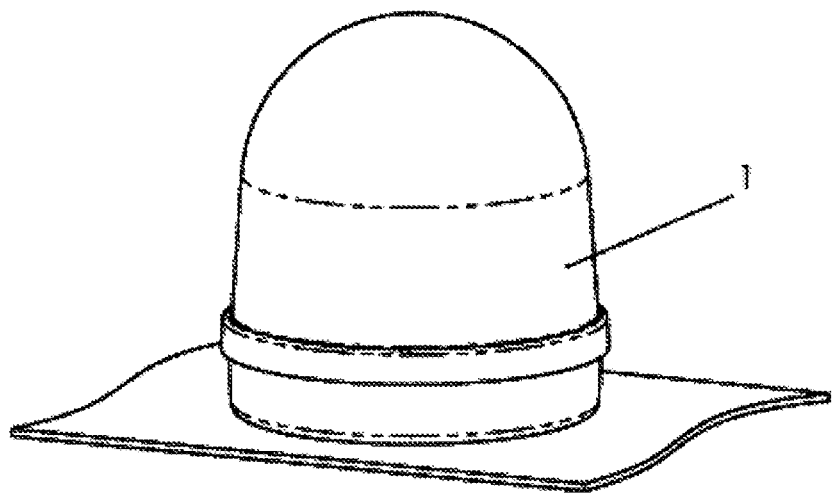
FIG. 18a shows an outer protective cover (radome).
Figure 18:
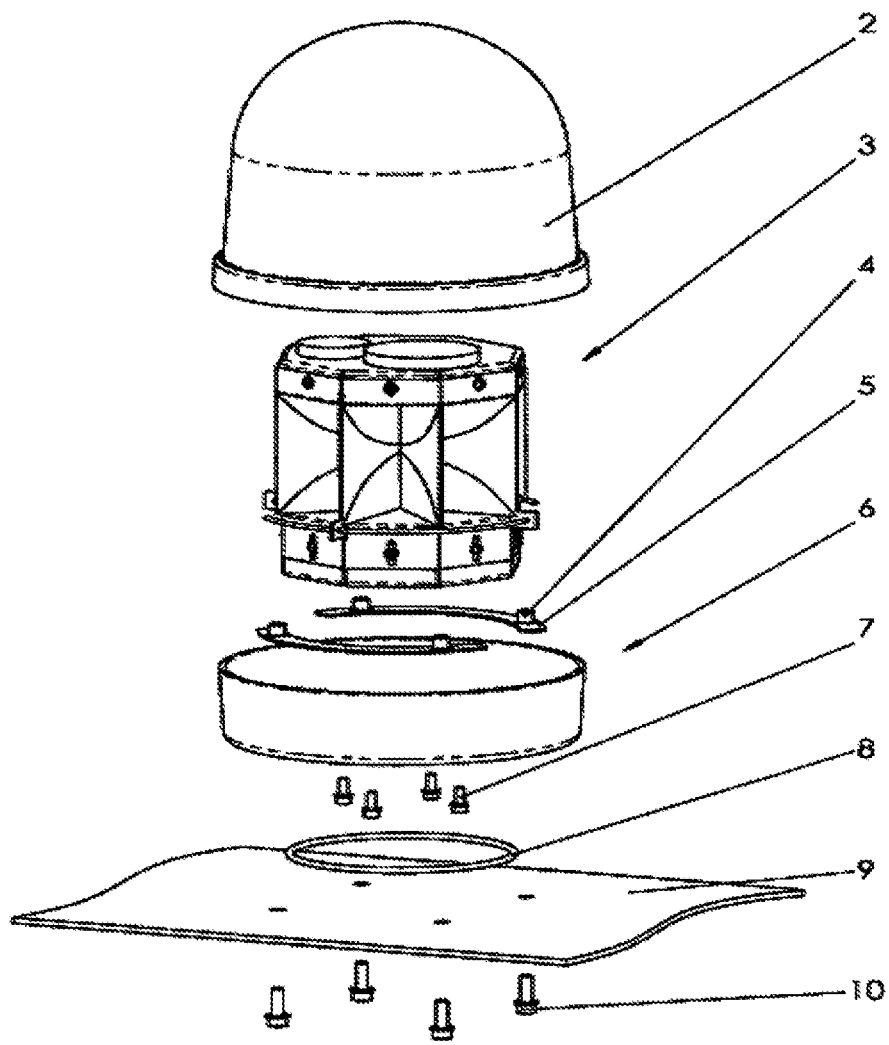
FIG. 18 shows a mounting illustration.

FIG. 18 illustrates mounting according to the use of the antenna system according to the invention of the present exemplary embodiment inside a plastic radome 1 consisting of an upper part 2 and a lower part 6 with the aid of fastening elements 4, 5, 7, 8, 10 and a sealing element 8 on a non-planar surface 9.

The exemplary embodiment described relates to a particularly preferred embodiment of the invention without restricting the latter to this example.

In an embodiment which is not illustrated here, the lower part 6 can be connected to the lower housing part 19 of the lower receiving box 28 by means of bolts and a pressure plate, the supply for the entire arrangement being able to be moved onto the pressure plate. Forwarding can be effected by means of standardized connecting elements or cables.

The invention claimed is:

1. A multi-function antenna system with a radar reflector, comprising
at least two bipolar radiating elements, at least one of which is a primary-fed radiating element and at least one of which is a secondary-fed radiating element,
the radiating elements being symmetrically arranged in a cross-wise manner at an angle of 90°+/−10° and being electrically connected to one another at least at their intersection, the radiating elements being in the form of bipolar conductive surfaces on or in a dielectric carrier and being permanently connected to the latter, the radiating elements having a common central axis of symmetry, wherein the bipolar conductive surfaces of each radiating element are symmetrical to the axis of symmetry, wherein the axis of symmetry runs in a vertical direction of the radiating elements, and wherein a radial direction runs perpendicular to the axis of symmetry, the dielectric carrier having radially outer edges, the conductive surfaces having their greatest vertical extension at the axis of symmetry, wherein the vertical extension of the conductive surfaces decreases in each case from the axis of symmetry radially outwards towards an outer edge of the dielectric carrier, wherein the conductive surfaces each have a boundary line that comprises linear sections and non-linear sections, the primary-fed radiating element having at least one feeding line for coupling electromagnetic signals in and out, the primary-fed radiating element feeding the secondary-fed radiating element, a first metal body arranged on the top of the radiating elements, in a manner orthogonal to the axis of symmetry, a second metal body arranged on bottom of the radiating elements in a manner orthogonal to the axis of symmetry, wherein the primary-fed radiating element and the secondary-fed radiating element are being conductively and mechanically connected to the first and second metal bodies, respectively, and filters, wherein the filters comprise planar structures and/or a combination of planar structures with concentrated components.

2. The antenna system as claimed in claim 1, wherein the first and second metal bodies are in the form of conductive boxes.

3. The antenna system as claimed in claim 2, wherein additional antennas are arranged on the conductive boxes.

4. The antenna system as claimed in claim 1, wherein in addition to the primary-fed radiating element and the secondary-fed radiating element further secondary-fed radiating elements are provided which have an angular offset of 45° in each case to the primary-fed radiating element and the secondary-fed radiating element, wherein the further secondary-fed radiating elements are arranged around the axis of symmetry and are electrically connected to the primary-fed radiating element and the secondary-fed radiating element.

5. The antenna system as claimed in claim 1, wherein an electrically insulated contact point for receiving further antennas is fitted to at least one dielectric carrier outside the region of the conductive surface.

6. The antenna system as claimed in claim 1, wherein the connection of the primary-fed radiating element with the secondary-fed radiating element comprises inserting one of the radiating elements into the other radiating element along slots arranged in the radiating elements.

7. The antenna system as claimed in claim 1, wherein the filters are fitted between the feed point of the feeding line and following assemblies that are downstream of the feed point.

* * * * *